US011585885B2

(12) United States Patent
Tomioka

(10) Patent No.: US 11,585,885 B2
(45) Date of Patent: Feb. 21, 2023

(54) ELECTRONIC APPARATUS, ANGLE ESTIMATION SYSTEM, AND SIGNAL PROCESSING METHOD

(71) Applicant: KABUSHIKI KAISHA TOSHIBA, Tokyo (JP)

(72) Inventor: Tazuko Tomioka, Kawasaki Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 696 days.

(21) Appl. No.: 16/556,462

(22) Filed: Aug. 30, 2019

(65) Prior Publication Data

US 2020/0132798 A1 Apr. 30, 2020

(30) Foreign Application Priority Data

Oct. 31, 2018 (JP) .............................. JP2018-205012

(51) Int. Cl.
*G01S 3/04* (2006.01)
*H01Q 23/00* (2006.01)
*G01S 3/50* (2006.01)

(52) U.S. Cl.
CPC ................ *G01S 3/043* (2013.01); *G01S 3/50* (2013.01); *H01Q 23/00* (2013.01)

(58) Field of Classification Search
CPC . G01S 3/023; G01S 3/043; G01S 3/14; G01S 3/46; G01S 3/48; G01S 3/72; G01S 3/50; H01Q 23/00
See application file for complete search history.

(56) References Cited

U.S. PATENT DOCUMENTS

| 9,445,237 B1 * | 9/2016 | Nallampatti Ekambaram ............ H04W 4/023 |
| 10,935,623 B2 * | 3/2021 | Clymer ................ H01Q 1/3233 |
| 2019/0280740 A1 | 9/2019 | Tomioka |

FOREIGN PATENT DOCUMENTS

| JP | 2005283167 A | 10/2005 |
| JP | 2019158498 A | 9/2019 |

OTHER PUBLICATIONS

Hewer, et al., "Robust Preprocessing for Kalman Filtering of Glint Noise", IEEE Transactions on Aerospace and Electronic Systems, 1987, vol. AES-23, Issue 1, pp. 120-128.

(Continued)

*Primary Examiner* — Cassi J Galt
(74) *Attorney, Agent, or Firm* — Holtz, Holtz & Volek PC

(57) ABSTRACT

According to one embodiment, an electronic apparatus includes processing circuitry. The processing circuitry estimates a first AoA of an arrival wave corresponding to a received signal from a receiving element array. The processing circuitry determines whether the estimated first AoA is an outlier or not. The processing circuitry outputs the first AoA as a second AoA, when the first AoA is not to be an outlier. The processing circuitry acquires one or more main-lobe angles assuming that the first AoA is a side-lobe angle of the receiving element array, when the first AoA is to be an outlier. The processing circuitry determines whether the main-lobe angle is an outlier or not. The processing circuitry outputs the main-lobe angle as the second AoA, when the main-lobe angle is not to be an outlier.

10 Claims, 10 Drawing Sheets

(56) References Cited

OTHER PUBLICATIONS

Loomis III, "Frequency-Agility Processing to Reduce Radar Glint Pointing Error", IEEE Transactions on Aerospace and Electronic Systems AES-10(6), Dec. 1974, pp. 811-820.

Tomioka, "Angilar Error Quantification of Frequency Agility Radar with Large Power Pulse Selection", IEICE Technical Report, Apr. 2014, vol. 114 No. 20, SANE2014-3, pp. 13-18.

* cited by examiner

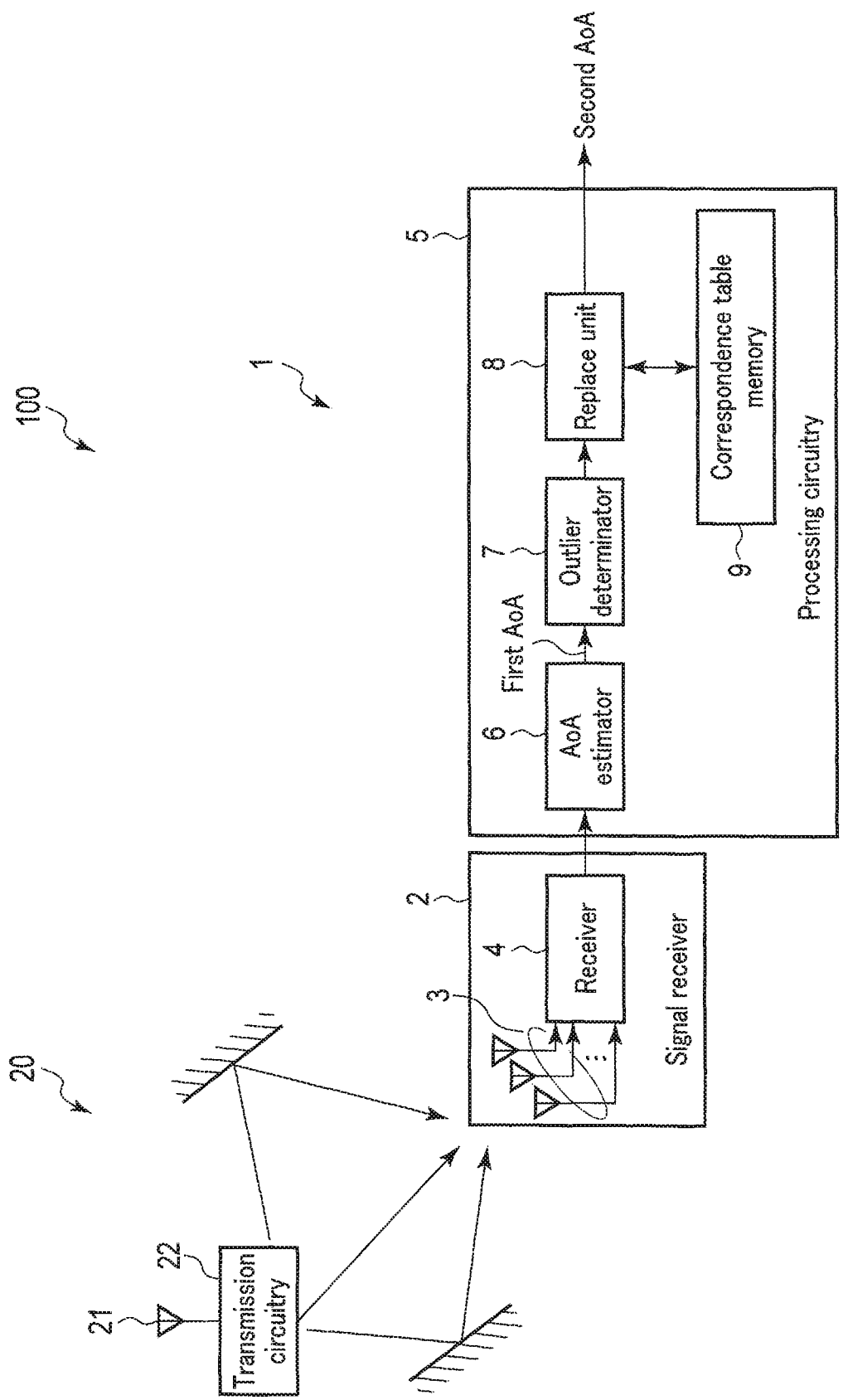
F I G. 1

| Side-lobe angle[deg] | Main-lobe angle 1[deg] | Main-lobe angle 2[deg] | Main-lobe angle 3[deg] |
|---|---|---|---|
| 0 | 180 | — | — |
| 1 | 179 | 178 | — |
| 2 | 177 | — | — |
| | | | |
| 359 | 181 | 182 | — |

FIG. 3

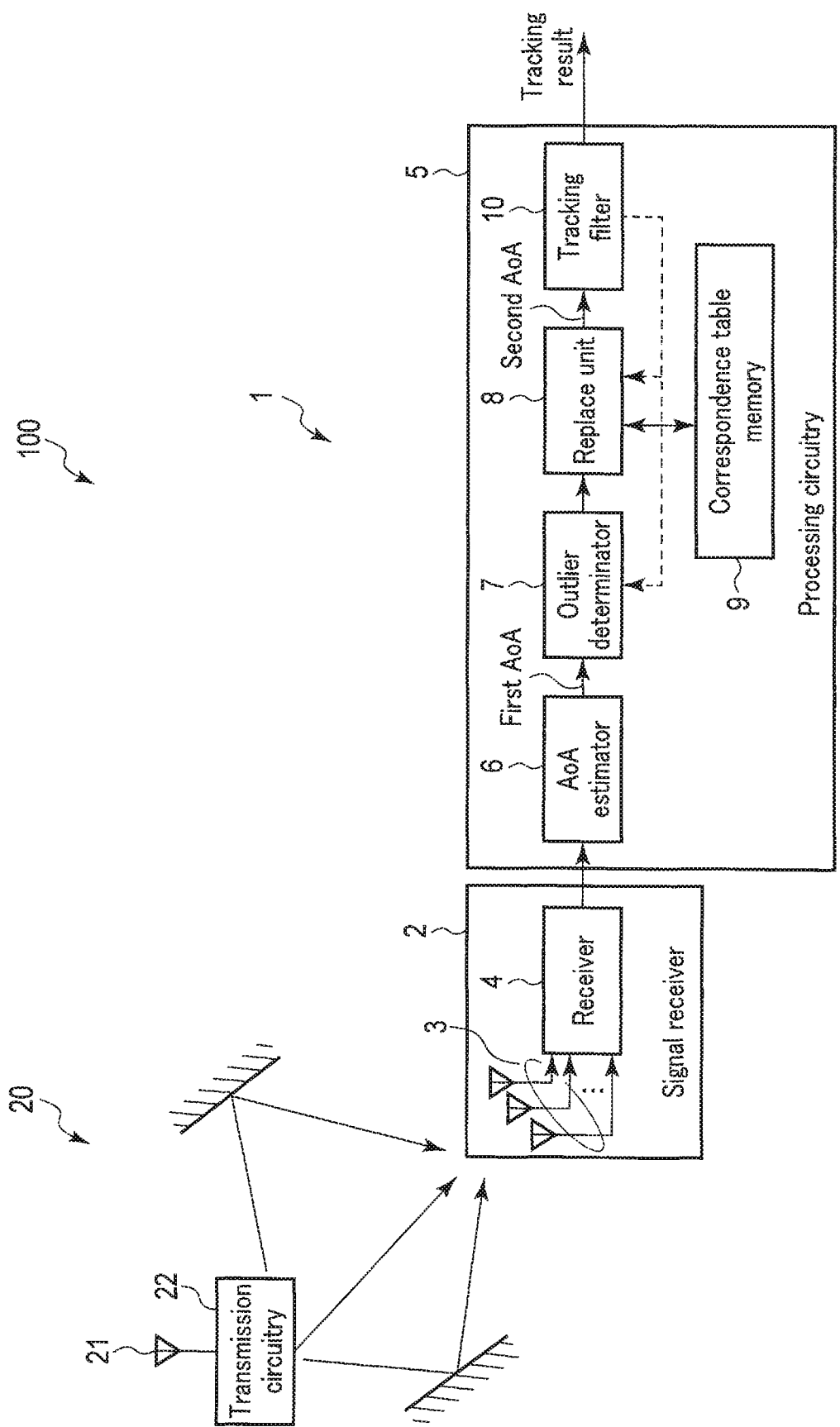
F I G. 4

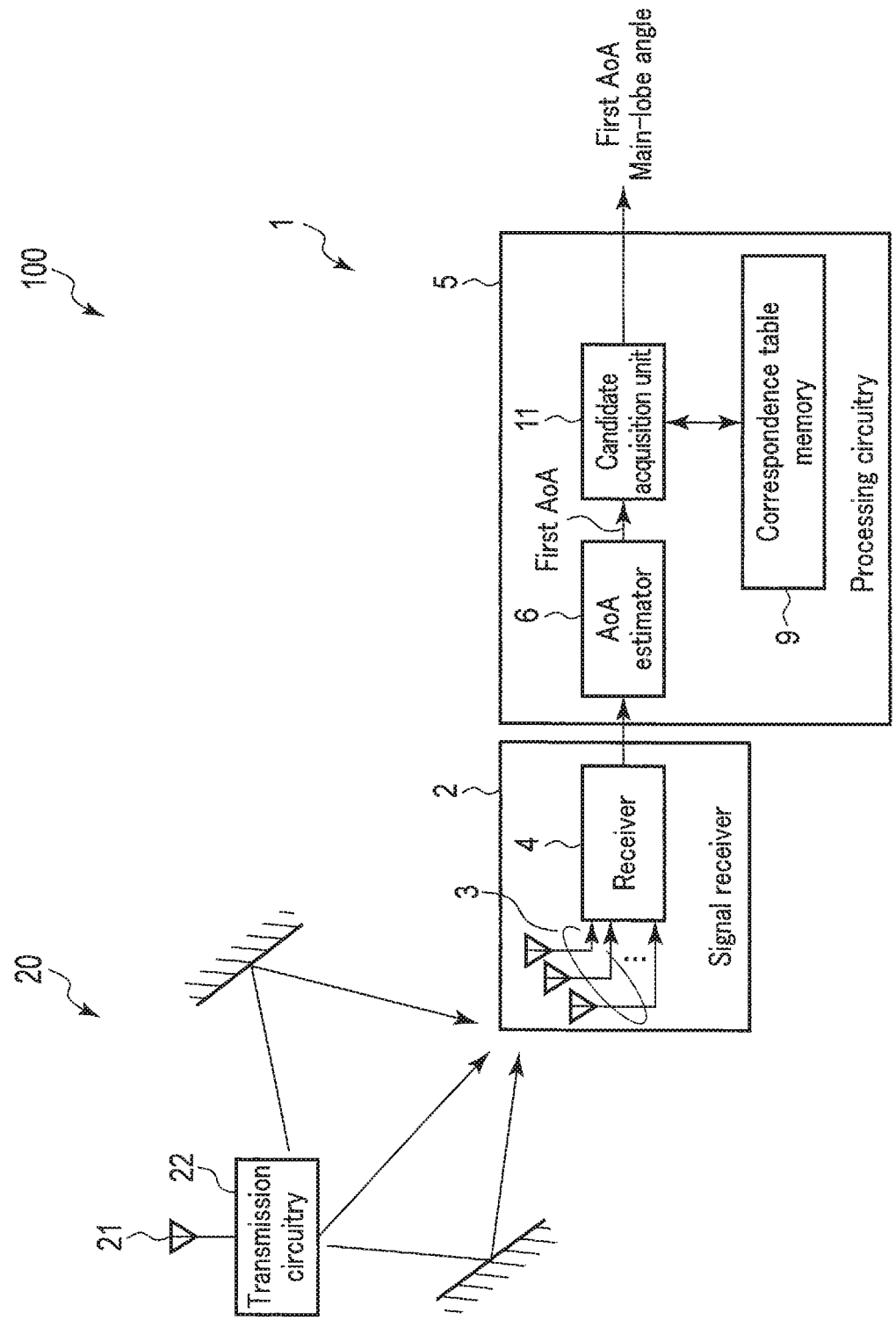
F I G. 7

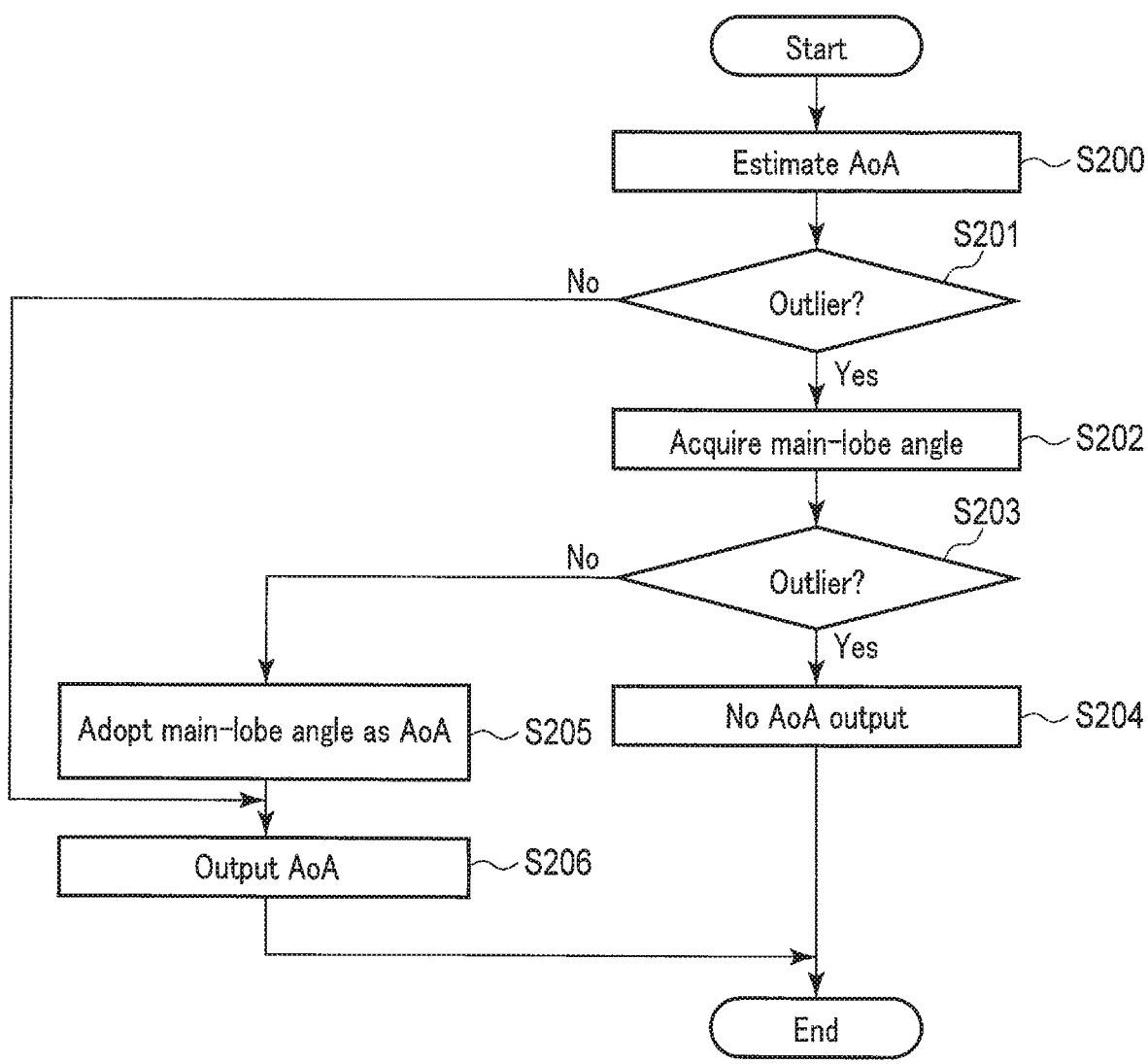
F I G. 8

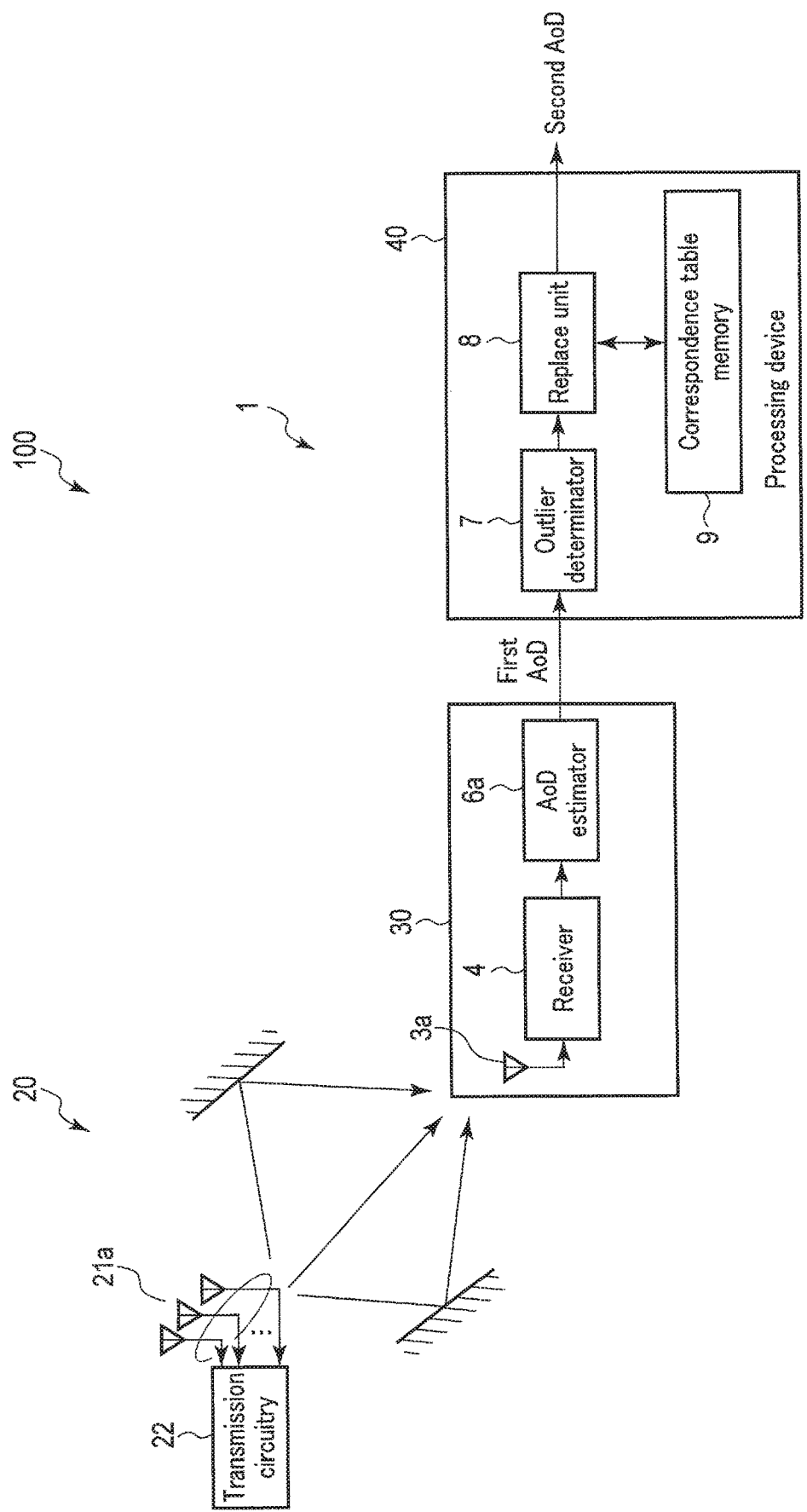
F I G. 9

ELECTRONIC APPARATUS, ANGLE ESTIMATION SYSTEM, AND SIGNAL PROCESSING METHOD

CROSS-REFERENCE TO RELATED APPLICATIONS

This application is based upon and claims the benefit of priority from the Japanese Patent Application No. 2018-205012, filed Oct. 31, 2018, the entire contents of which are incorporated herein by reference.

FIELD

Embodiments described herein relate generally to an electronic apparatus, an angle estimation system, and a signal processing method that estimate the angle of a wave source.

BACKGROUND

According to Internet of Things (IoT) development, wireless tags are expected to be used in various scenes. A system of detecting the position of a wireless tag by a receiver device has been known as a technique related to utilization of a wireless tag.

The direction of a wireless tag needs to be detected in order to estimate the position of the wireless tag by a single receiver device. A method of estimating the direction of arrival of radio waves based on the phase difference of received signals between antenna elements of an antenna array has been known as a method of detecting the direction of a device that emits radio waves. Representative methods include the MUltiple SIgnal Classification (MUSIC).

Wireless tags are typically used inside buildings. Accordingly, in a typical wireless tag use environment, occurrence of multipath is inevitable. Consequently, according to a direction-of-arrival estimation method of estimating the AoA (angle of arrival) by processing received signals of an antenna array, such as MUSIC, an estimated AoA includes an error due to multipath. Multipath can be separated in principle by an advanced method, such as spatial smoothing. However, to decompose the multipath into elementary waves, requirements for the number of antenna elements and the array shape are tough. Accordingly, application to low-cost consumer products is difficult.

In a case with multipath, the error extremely varies owing to the interference state of multiple waves included in the multipath. Accordingly, estimated AoAs frequently cause outliers. Consequently, AoAs are not normally distributed in typical cases. The direction of a wireless tag is sometimes tracked by a Kalman filter or the like. However, tracking filters are often designed assuming that errors are normally distributed. Accordingly, with inputs including many outliers, stable tracking result cannot be acquired. Accordingly, tracking is often performed, with outliers being preliminarily excluded.

If the outliers are excluded from the inputs to a tracking filter, tracking is performed skipping samples of excluded times. Consequently, if outliers are consecutive over a long period and the direction of a wireless tag varies continuously in particular, correct tracking is difficult.

If the outliers are simply excluded as described above, tracking becomes unstable. The outliers correspond to directions completely different from the direction of the wireless tag. Inputs including outliers depart from normally distributed noises, which are assumed for designing a tracking filter. Accordingly, if tracking is performed without exclusion, it is a matter of course that no stable result is expected.

Embodiments provide an electronic apparatus, an angle estimation system, and a signal processing method that can perform stable tracking even if outliers are consecutive for a long period.

BRIEF DESCRIPTION OF THE DRAWINGS

FIG. 1 illustrates the configuration of a first example of an angle estimation system according to an embodiment;

FIG. 3 illustrates an example of a side-lobe/main-lobe correspondence table;

FIG. 4 illustrates the configuration of a second example of an angle estimation system according to an embodiment;

FIG. 7 illustrates the configuration of a third example of an angle estimation system according to an embodiment;

FIG. 8 is a flowchart illustrating an algorithm of a signal processing method according to an embodiment;

FIG. 9 illustrates the configuration of a fourth example of an angle estimation system according to an embodiment.

DETAILED DESCRIPTION

Figure 2A:
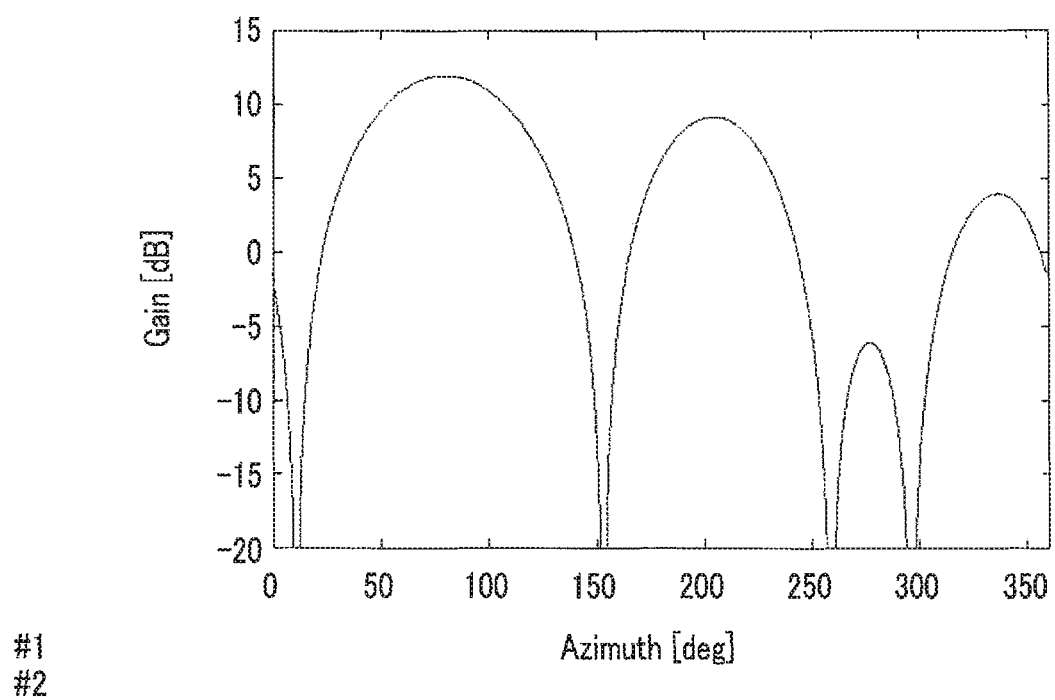
FIG. 2A illustrates an example of an antenna gain pattern in a case where the main lobe is oriented in an azimuth of 80 degrees by a four-element circular antenna array.

In general, according to one embodiment, an electronic apparatus includes processing circuitry. The processing circuitry estimates a first angle of arrival (AoA) of an arrival wave corresponding to a received signal from a receiving element array, based on the received signal. The processing circuitry determines whether the estimated first AoA is an outlier or not, based on a first criterion. The processing circuitry outputs the first AoA as a second AoA, when the first AoA is not to be an outlier. The processing circuitry acquires one or more main-lobe angles assuming that the first AoA is a side-lobe angle of the receiving element array, when the first AoA is to be an outlier. The processing circuitry determines whether the main-lobe angle is an outlier or not, based on a second criterion. The processing circuitry outputs the main-lobe angle as the second AoA, when the main-lobe angle is not to be an outlier.

Hereinafter, embodiments will be described with reference to the drawings. In the following descriptions, illustrations and explanations for unnecessary parts of embodiments will be omitted.

FIG. 1 illustrates the configuration of a first example of an angle estimation system according to an embodiment. The AoA estimation system 100 comprises an electronic device 1, and a transmitter 20.

The transmitter 20 comprises an antenna 21 for transmission, and transmission circuitry 22 that generates a signal to be transmitted. The transmitter 20 radiates a signal. In a case where the transmitter 20 is inside a building or the like, a signal emitted from the transmitter 20 travels on a plurality of paths by reflection by walls or the like to become a multipath signal, and reaches the electronic device 1.

The electronic device 1 comprises a signal receiver 2. The signal receiver 2 comprises an antenna array 3, and a receiver 4.

The antenna array 3 comprises a plurality of antenna elements. The antenna array 3 receives arrival waves from the transmitter 20, and outputs a received signal in accordance with the arrival waves to the receiver 4.

The receiver 4 processes the received signal output from the antenna array 3. The receiver 4 comprises, for example, various types of circuitry for executing various receiving processes on a physical layer, such as an amplification process, a filtering process, a baseband conversion process, and an A/D (analog to digital) conversion process. The receiver 4 may comprise circuitry for executing processes for digital signals on a protocol layer, such as error detection and correction, and packet reading, if required. Here, the receiver 4 may comprise receiving systems as many as the antenna elements, for example. The receiver 4 may comprise a receiving system, such as of Bluetooth® standards, and time-sequentially switch antenna elements to be coupled to the receiving system.

The electronic device 1 comprises processing circuitry 5. The processing circuitry 5 comprises, for example, a digital signal processor, such as a CPU, an ASIC, an FPGA, or a DSP. The processing circuitry 5 may comprise memories, such as DRAM and SRAM. The processing circuitry 5 may comprise a plurality of digital signal processors, and memories.

The processing circuitry 5 comprises an AoA estimator 6, an outlier determinator 7, a replace unit 8, and a (side-lobe/main-lobe) correspondence table memory 9. The AoA estimator 6, the outlier determinator 7 and the replace unit 8 are constructed by software, for example. It is a matter of course that the AoA estimator 6, the outlier determinator 7 and the replace unit 8 may be constructed by hardware. The correspondence table memory 9 is constructed by a nonvolatile memory, such as a flash memory, for example.

The AoA estimator 6 estimates the AoA that indicates the direction of arrival of arrival waves. The AoA is estimated using, for example, complex signals that are received signals and have not been demodulated yet. The AoA estimator 6 receives, from the signal receiver 2, complex signals received by all the antenna elements for AoA estimation, and estimates the AoA of wireless signals. The AoA estimator 6 estimates the AoA by the MUSIC method, for example. It is a matter of course that the AoA estimator 6 may estimate the AoA by another scheme. Hereinafter, the AoA estimated by the AoA estimator 6 is referred to as a first AoA.

The outlier determinator 7 determines whether the first AoA estimated by the AoA estimator 6 is an outlier or not based on a first criterion. The determination based on the first criterion will be described later in detail. The outlier determinator 7 outputs a determination result of whether the first AoA is an outlier or not, together with the first AoA, to the replace unit 8.

If the first AoA is not an outlier, the replace unit 8 outputs the first AoA as it is. On the contrary, if the first AoA is an outlier, the replace unit 8 refers to a table stored in the correspondence table memory 9. The replace unit 8 then acquires the main-lobe angle in a case where the first AoA is the side-lobe angle. The side-lobe angle is an angle indicating the direction of a side lobe when the antenna array 3 forms a beam. The main-lobe angle is an angle indicating the direction of the main lobe when the antenna array 3 forms the beam. The replace unit 8 then determines whether the acquired main-lobe angle is an outlier or not, based on a second criterion. If the main-lobe angle is not an outlier, the replace unit 8 outputs the main-lobe angle instead of the first AoA. Hereinafter, the AoA output from the replace unit 8 is referred to as a second AoA.

The correspondence table memory 9 stores a side-lobe/main-lobe correspondence table. The side-lobe/main-lobe correspondence table is a table that indicates the correspondences between the side-lobe angles and the main-lobe angles when the antenna array 3 forms beams.

Hereinafter, the operation of the AoA estimation system will be described. An AoA estimation scheme, such as MUSIC, for example, using received signals from the antenna array, detects the correlation between the steering vectors of the antennas and the received signals. A steering vector is a vector that describes the phase difference and the amplitude difference between the antenna elements. The steering vector indicates the phase difference and the amplitude difference of signal components received by the respective antenna elements when only one ideal plane wave arrives. The steering vector is a function of AoA.

A steering vector indicates the antenna weight most suitable for receiving an ideal plane wave from a known AoA. When a beam is formed according to the antenna weight, side lobes are formed at angles different from the angle of the main lobe.

FIG. 2A illustrates an example of an antenna gain pattern in a case where the main lobe is oriented in an azimuth of 80 degrees by a four-element circular antenna array. In FIG. 2A, the peak indicating the main lobe is at the direction of 80 degrees. On the other hand, FIG. 2A illustrates the peaks indicating side lobes in three directions different from the 80-degree direction. Specifically, in FIG. 2A, the peaks indicating the side lobes are at 205, 278 and 337 degrees. The side lobe occurs because the correlation between the steering vector indicating the beam weight and the steering vector of the side-lobe direction is high.

In the example of FIG. 2A, the elevation angle is 0 degree. In the following description, it is assumed that the elevation angle is approximately 0 degree and only the azimuth is detected. If both the azimuth and the elevation angle are detected, pairs of azimuths and elevation angles may form the side-lobe/main-lobe correspondence table, thereby acquiring the main-lobe angle. Alternatively, even when a wireless signal arrives in an elevation angle that is not 0 degree, the main-lobe angle may be acquired with reference to a table including only azimuths.

In a case with multipath, multiple waves with coherence are received with interference. If the multiple waves have strong coherence, the multiple waves look like a single combined wave to be seen by an algorithm, such as MUSIC, unless a special preprocess is applied. Accordingly, the phase difference and the amplitude difference of received waves of antenna elements between the antenna elements are different from those of plane waves.

In many cases, the angle intended to be estimated by AoA estimation is the direction of the transmitter, that is, the direction of line of sight (LOS) component included in multipath. Even if the correlation between the multipath received waves having strong coherence and the steering vector (to be exact, low correlation with a noise subspace, in the case of MUSIC) is calculated by an algorithm, such as MUSIC, what is received is only waves in which multiple paths are combined. Accordingly, the steering vector in the direction of LOS component and the received signal do not have clear, high correlation. If the LOS component is stronger than the non-line of sight (NLOS) component, there is a high possibility that the received signal has not small correlation with the steering vector in the direction of the LOS component even though the correlation is not complete. In many cases, the received signal is, simply, very similar to a steering vector having an angle slightly different from the angle of the LOS component. The AoA estimated in such cases is not an outlier and has an error in a normal range.

If the disturbance due to multipath is larger, the received signal is often similar to the steering vector corresponding to the side-lobe angle in a case where the main lobe is in the direction of the LOS component. This is because the steering vector at the main-lobe angle is similar to the steering vector at the side-lobe angle. Accordingly, an angle adjacent to the side-lobe angle in the case where the main lobe is in the direction of the LOS component serves as an estimated angle, and an outlier sometimes occurs.

If it is found that the first AoA is an outlier, the processing circuitry 5 in the embodiment acquires the main-lobe angle in a case where the first AoA is regarded as a side-lobe angle. If the acquired main-lobe angle is not an outlier, the processing circuitry 5 then outputs the main-lobe angle as the second AoA, instead of the first AoA. The causes of the outlier include not only the similarity between the main lobe and the side lobe, but also glint noise, which is caused because the direction perpendicular to the wavefront is significantly different from the wave traveling direction owing to a strong distortion over a wide range of the wavefront in the case of multipath interference. The outlier due to glint noise is not corrected by replacement with the main-lobe angle. However, the method of the embodiment reduces the frequency of the outlier.

The simplest method of acquiring the main-lobe angle when the estimated AoA is the side-lobe angle is a method of preliminarily creating the side-lobe/main-lobe correspondence table.

Figure 2B:
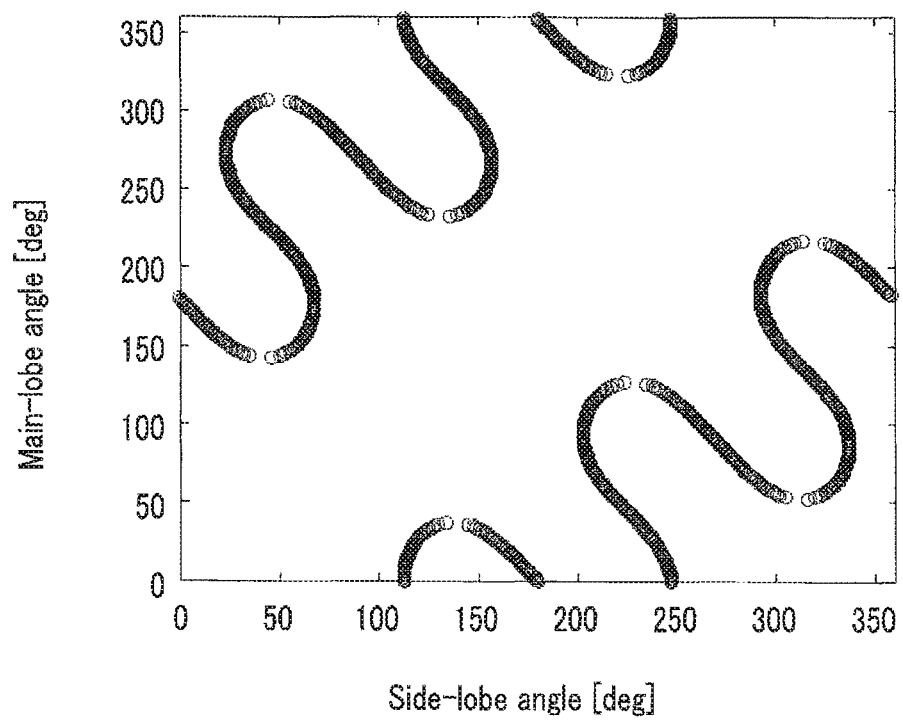
FIG. 2B illustrates an example of the correspondence relationship between the side-lobe angle and the main-lobe angle.

FIG. 2B illustrates an example of the correspondence relationship between the side-lobe angle and the main-lobe angle. FIG. 2B illustrates an example of the correspondence relationship in a case where the main lobes are in the respective azimuths of the four-element circular antenna array. In FIG. 2B, the abscissa axis is the side-lobe angle, and the ordinate axis is the main-lobe angle. The side-lobe angle to the main-lobe angle can be detected by forming a beam through simulation based on the arrangement of the antenna elements and by detecting the peak of side lobe from the beam. The graph of FIG. 2B is acquired by replacing the ordinate axis and the abscissa axis of the pair of the main-lobe angle and the side-lobe angle calculated as described above with each other and by plotting the replaced pair.

The table is created by organizing the pairs of the preliminarily detected main-lobe angles and side-lobe angles such that the pairs can be searched based on the side-lobe angle. FIG. 3 illustrates an example of the side-lobe/main-lobe correspondence table. As shown in FIG. 2B, there are a plurality of main-lobe angles for single side-lobe angle. Accordingly, as shown in FIG. 3, the side-lobe/main-lobe correspondence table is configured to be capable of storing the main-lobe angles for the single side-lobe angle. Procedures of selecting one from among the main-lobe angles will be described later.

The side-lobe/main-lobe correspondence table does not necessarily have the form in FIG. 3. For example, the graph illustrated in FIG. 2B may be held in a form of a matrix. In this case, areas that are not plotted on the graph may be blank, for example; it is only required to clarify the fact that no main-lobe angle corresponds to the side-lobe angle. The side-lobe/main-lobe correspondence table may be a table of the side-lobe angles, as they are, with respect to the main-lobe angle. In this case, the corresponding main-lobe angle is searched for, with the estimated first AoA being adopted as the side-lobe angle.

The table of FIG. 3 stores both the main-lobe angle and the side-lobe angles in units of one degree. The granularity of angle is not necessarily one degree. That is, the granularity of angle in the table may vary in conformity with the angular resolution required for the AoA. With a table having a low granularity, if the first AoA is estimated in finer units, no side-lobe angle corresponds to the estimated first AoA in some cases. In such cases, a side-lobe angle closest to the estimated first AoA may be acquired among the side-lobe angles held as the table.

If the table is not held, every time necessity of acquiring the main-lobe angle arises, the relationship between the side-lobe angle and the main-lobe angle may be calculated based on information on the arrangement (coordinates) of the antenna elements of the antenna array 3. In this case, no side-lobe/main-lobe correspondence table is required to be preliminarily stored in the processing circuitry 5. The relationship between the side-lobe angle and the main-lobe angle can be relatively easily calculated through simulation using only information on the arrangement of the antenna elements.

The beam pattern calculated based only on the actual beam pattern of the antenna array and the information on the arrangement of the antenna elements often vary according to the radiation characteristics of each element itself, the coupling between the elements, interaction with a finite ground, interaction with a circuit pattern, etc. In such cases, if the side lobe is detected by creating a beam pattern based on data on the antenna elements acquired through electromagnetic field analysis or actual measurement, the side-lobe/main-lobe correspondence table based on actual device characteristics can be created.

In the case with the antenna characteristics acquired through electromagnetic simulation or actual measurement, calibration may be performed using the antenna characteristics when the AoA is estimated. The calibration methods include a method of changing the steering vector during AoA estimation, based on the antenna characteristics. For AoA estimation, the correlation with the signal is calculated using the calibrated steering vector. Accordingly, the relationship between the side lobe and the main lobe is also acquired using the calibrated steering vector. Thus, the side-lobe/main-lobe correspondence table is preferred to be acquired by calculating the beam pattern using the calibrated steering vector.

Next, an outlier determination method is described. In the embodiment, it is determined whether the first AoA is an outlier or not based on the first criterion. If the first AoA is an outlier, it is determined whether the main-lobe angle in a case of adopting the first AoA as a side-lobe angle is an outlier or not based on the second criterion.

First, an outlier determination method for the first AoA is described. The simplest method is a method of performing AoA estimation multiple times while the same wave source does not move too much, and of regarding clearly different AoAs among the results of the AoA estimation as outliers. According to another method, AoAs with received signals having a clearly low power may be excluded as outliers. A plurality of indicators for outlier determination may be combined.

Further alternatively, as described later, if a predicted value is acquired by tracking, a case with the absolute value of the difference between the predicted value and the first AoA is equal to or more than a threshold may be determined as that of an outlier. The threshold may be adaptively changed in conformity with the received power or the like. For example, the higher the power of the received signal is, the higher the probability that the error of the first AoA is small is. Consequently, if the power is high, the possibility that the error is small is assumed to be high even though the difference from the predicted value is large, and the threshold may be large.

The power used for outlier determination may be a received power for an antenna element. In a multipath environment, the received power often varies among the antenna elements. Accordingly, it is desirable to use the total power or averaged power of all the antenna elements instead of the received power of an antenna element. In a case where a beam is formed in the direction indicated by the first AoA and power is extracted, power with high accuracy can be acquired even with much noise. In a case where eigenvalue decomposition is used for AoA estimation, the power of all the antenna elements in the signal subspace, or the power extracted by forming a beam in the direction indicated by the first AoA in the signal subspace may be used.

Next, an outlier determination method for the main-lobe angle is described. A predicted value of the tracking filter is mainly used for outlier determination of the main-lobe angle based on the second criterion. The details will be described later. First, a selection method in a case of multiple main-lobe angles for a side-lobe angle is herein described.

The simplest method is a method that does not select a specific main-lobe angle but determines whether each of the main-lobe angles is an outlier or not based on the second criterion and adopts an angle that is not an outlier as the second AoA. In a case where two or more main-lobe angles satisfy the second criterion, the angle having the most favorable indicator value used for the corresponding determination, that is, the angle having the least possibility of being an outlier, may be adopted. The main-lobe angle with the most favorable indicator value is the main-lobe angle with the smallest difference from the predicted value or the main-lobe angle with the smallest difference from the AoA output at another time, for example. In the case where a main-lobe angle is selected as described above, the selected main-lobe angle has already been determined not to be an outlier based on the second criterion. Consequently, it is not required to determine further the selected main-lobe angle based on the second criterion.

The other methods include a method that calculates together the power of a side lobe with the main lobe when calculating a beam pattern, records the correspondence between the main lobe power and the side lobe power in the table, and adopts the main lobe with the side lobe having high power, with reference to the recorded table. In this case, the angle of the main lobe corresponding to the side lobe with the maximum power may be selected. The other methods include a method that sequentially selects the main-lobe angles in a descending order of power, and stops the selection when the second criterion is satisfied.

The other methods include a method that forms beams at a plurality of main-lobe angles, detects the powers, and determines the main-lobe angle with high power based on the second criterion. The other methods include a method that sequentially selects the main-lobe angles in a descending order of power, determines the selected main-lobe angle based on the second criterion, and stops the determination when the second criterion is satisfied.

The outlier determination method based on the first criterion and the outlier determination method based on the second criterion may be identical to or different from each other. If the outlier determination method is identical, a parameter used for determination, such as a threshold, may be identical to or different from each other. According to a modification thereof, without the determination based on the first criterion, the determination based on the second criterion may be performed for the first AoA and one or more main-lobe angles at the same time, and as a result of the determination, the main-lobe angle with the most excellent indicator may be selected.

The AoA estimation system 100 in the embodiment comprises the electronic device comprising the antenna, and the transmitter. However, the AoA estimation system 100 in the embodiment does not necessarily comprise an electronic device comprising an antenna, and a transmitter, only if the environment need to remedying the frequency of outliers of AoA estimation through the array elements in a multipath environment. For example, AoA estimation through array elements may be applied to sound waves, to which a substantially identical principle applies for operation. Consequently, the AoA estimation system 100 may comprise an electronic device that comprises a receiving element array including a sound collecting element, such as a microphone, instead of an antenna. In this case, for example, the transmitter may be replaced with a sound source, such as a loudspeaker, a human speaker or an oscillator, or a sound wave reflection source.

In FIG. 1, the wave source is the transmitter. However, the wave source applicable to the embodiment is not necessarily a wave source configured with an intention of emitting a signal, for example, the transmitter. The wave source applicable to the embodiment may be a noise source, such as a microwave oven, or a radar target that emits no signal by itself but reflects radio waves from another source.

FIG. 4 illustrates the configuration of a second example of an angle estimation system according to an embodiment. The difference from FIG. 1 is that processing circuitry 5 comprises a tracking filter 10, and a second AoA output from a replace unit 8 is input into the tracking filter 10. Except the operation related to the tracking filter 10, the configuration is similar to that in FIG. 1. Accordingly, the description thereof will be omitted.

The tracking filter 10 is a Kalman filter, for example, and tracks the angle of the transmitter 20 with reference to the electronic device 1. The tracking filter 10 outputs an estimated value acquired by tracking, as a tracking result. According to tracking, in a case where the angle of the target varies at every moment, possible missing of input for a long period sometimes causes the predicted value or the estimated value to deviate largely from a correct value, that is, it comes into what is called an untracked state.

Only with exclusion of first AoAs determined as outliers, input to the tracking filter 10 is missed for a long period, thereby causing a possibility of coming into the untracked state. Accordingly, unlike the above description where first AoAs are simply excluded as outliers, what can be replaced with the main-lobe angle among the first AoAs is replaced, thereby reducing the frequency of outliers. Consequently, the possibility of missing input to the tracking filter 10 for a long period decreases, and the tracking can be prevented from being derailed.

In the example in FIG. 4, the outlier determination for the first AoA using the first criterion, and the outlier determination for the main-lobe angle using the second criterion may be identical to or different from the method described above. Here, as another method, a method of determining the outlier using the predicted value output from the tracking filter 10 is described.

According to a tracking filter, such as a Kalman filter and an $\alpha\beta$ filter, besides the estimated value acquired by input value tracking, predicted values at a time ahead can be output. Through use of them, the second criterion can be set for the absolute value of the difference between the predicted value acquired by the tracking filter and the main-lobe angle. In this case, determination is performed such that if the absolute value of the difference is within a predetermined range, for example, within 30 degrees, the value is not an outlier, and if the value exceeds 30 degrees, the value is an outlier. For such determination, the tracking filter 10 inputs the predicted value into the replace unit 8 as indicated by a broken arrow. The replace unit 8 performs the outlier determination for the main-lobe angle, based on the absolute value of the difference between the input predicted value and the main-lobe angle. If a plurality of main-lobe angles are input, the replace unit 8 selects the main-lobe angle with the minimum absolute value of the difference. The absolute value of the difference for each of all the main-lobe angles is out of the predetermined range, the replace unit 8 does not input the second AoA into the tracking filter 10. At this time, the tracking filter 10 skips times having missing of input, assumes that inputs are virtually made in a time interval between the previous and subsequent times, and performs tracking.

The outlier determination for the first AoA by the outlier determinator 7 using the first criterion may be performed based also on the predicted value from the tracking filter 10. In this case, the tracking filter 10 inputs the predicted value also into the outlier determinator 7.

In a case where, as with a Kalman filter, the filter is an adaptive tracking filter that can adaptively change a parameter, such as a gain, based on the characteristics of an input value, observed noise (an error included in a measurement value) is preferred to be changed in accordance with the received intensity. It has been known that the error variance of the estimated angle is inversely proportional to the power, in AoA estimation. Accordingly, the observed noise of the measurement value (angle) is preferred to be changed to be inversely proportional to the received amplitude (the square root of the received power). The method of acquiring the received power, based on which the received amplitude is to be calculated, is similar to that described above.

If the first AoA is not determined as an outlier and is input, as it is, as the second AoA into the tracking filter 10, the gain can be correctly adjusted by making the observed noise proportional to the received amplitude. On the contrary, even if the first AoA is determined as an outlier and the main-lobe angle is input as the second AoA instead, use of the received amplitude causes no problem. The received power when an outlier occurs is often low. Accordingly, in situations where the first AoA is an outlier, there is a high possibility that the error of the replaced main-lobe angle is not small either. According to a Kalman filter, when the observed noise is large, the gain that determines the contribution of a newly input value during update is small. The error of the main-lobe angle when the first AoA is an outlier is expected to be large. In this case, the trajectory is preferred to be maintained to an extent where the tracking is not derailed. Accordingly, it is rather desirable that the gain be small.

In a case where power in a specific AoA direction is used as the power, a beam is created in the direction of the main-lobe angle, and the power at the main-lobe angle may be extracted. In this case, the probability that the power at the main-lobe angle is lower than the power at the first AoA is high. Accordingly, the contribution of a newly input value becomes smaller.

The filter is not necessarily the tracking filter that can output the predicted value. Instead of the tracking filter, a filter defined by time-invariant impulse response, such as a filter of outputting a moving-average value, may be adopted. In a case of a filter incapable of outputting the predicted value, a latest estimated value may be used instead of the predicted value only if the movement of the wave source is small. Alternatively, in the case of a filter incapable of outputting the predicted value, outlier determination that does not require the difference from the predicted value, such as determination by power, may be adopted.

Instead of the adaptive tracking filter, a fixed coefficient filter, such as an $\alpha\beta$ filter, may be adopted. A filter that can support a nonlinear model, such as a particle filter, may be adopted.

In a case where outlier determination is performed using the predicted value acquired by the tracking filter 10, the predicted value is required to be correct to a certain extent. This is because the outlier determination is not correctly performed if the predicted value is not correct, and the trajectory follows the outlier. Accordingly, it is required to create an initial value of tracking so as not to be an outlier. For example, this is performed as follows.

When tracking is started, the AoA estimator 6 estimates a plurality of first AoAs in a short period during which the wave source does not largely move. The outlier determinator 7 performs a statistical process of a plurality of first AoAs acquired by the AoA estimator 6, for example, grouping of the first AoAs using the nearest neighbor algorithm, calculation of a histogram of the first AoAs, calculation of the average value and the standard deviation of the first AoAs and the like, thereby classifying the first AoAs into outliers and angles other than the outliers. The tracking filter 10 uses only the first AoAs that are not outliers to generate an initial trajectory of tracking. When the first AoAs are substantially equally classified into a group of outliers and a group of angles other than the outliers, the outlier determinator 7 weights the first AoAs with respective parameters, such as power, usable as indicators for outlier determination, and selects a group having a high probability of not being outliers. Alternatively, the outlier determinator 7 may select only first AoAs corresponding to favorable indicators among the first AoAs, and generate the initial trajectory of tracking. If a threshold for the indicators is set so as not to include outliers as less as possible, the number of samples sometimes becomes significantly small. In this case, it is preferred to allow the trajectory to be created even if intervals of samples are increased, by a method of approximating the trajectory with a linear function or a quadratic function that is not typical tracking trajectory. Even in a case of a first AoA corresponding to a favorable indicator, there is a possibility of being an outlier. The outlier determinator 7 may select the first AoA based on the indicator and subsequently exclude the outlier by a statistical process.

In a case where the first criterion is set for the difference from the predicted value of tracking and where determination that the first AoA is an outlier or replacement of the first AoA with the main-lobe angle continues for a long period, the predicted value is not correctly acquired, and there is a possibility that the outlier determination is not correctly performed. In preparation for such a case, if the number of continuous outliers exceeds a predetermined value or if the ratio of the number of outliers exceeds a predetermined number, the tracking filter 10 determines that a correct predicted value has not been acquired. The tracking filter 10 may perform initial value creation again.

Figure 5:
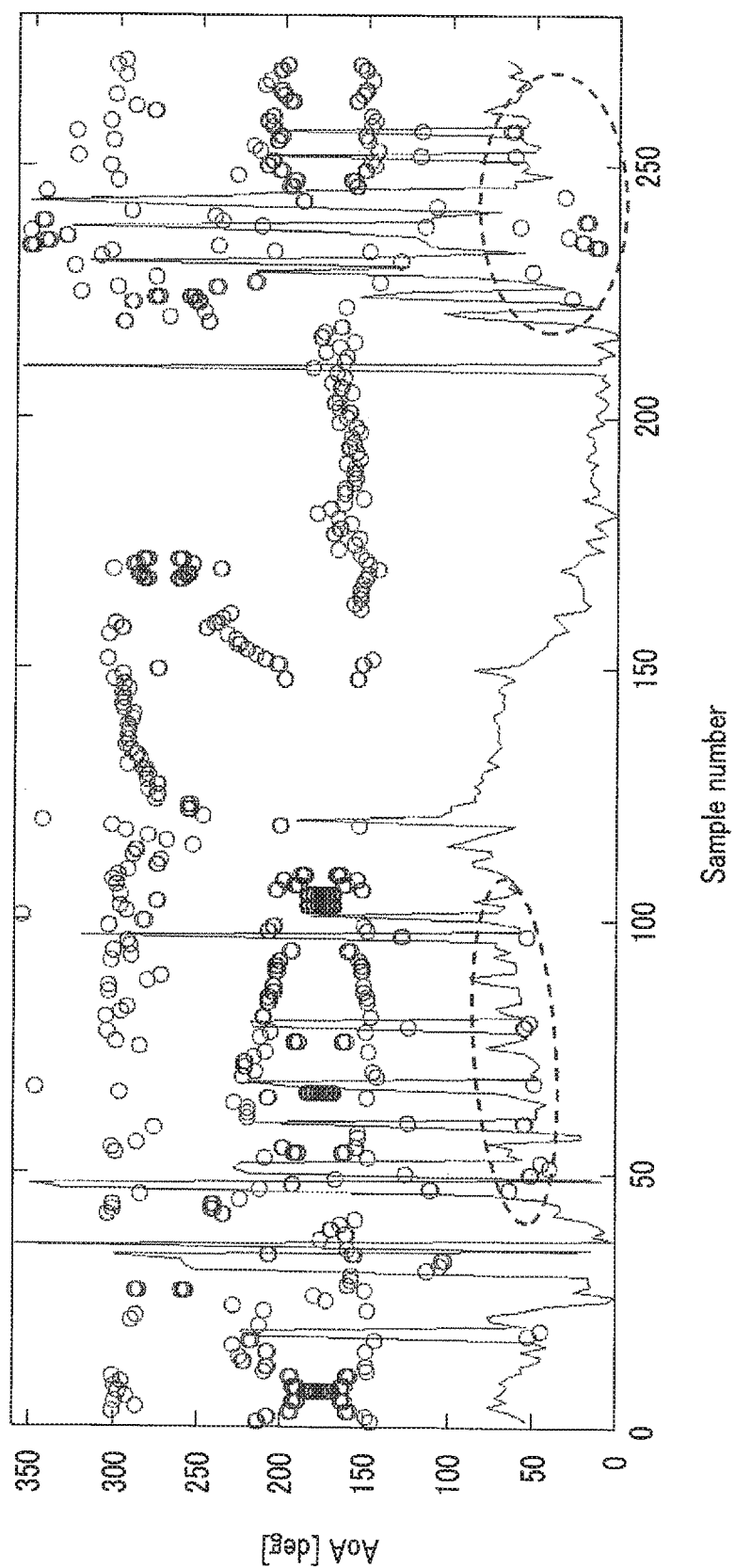
FIG. 5 illustrates an example of a result of estimating the azimuth of a wireless tag.

FIG. 5 illustrates an example of a result of estimating the azimuth of a wireless tag, which is an example of the transmitter 20 in FIG. 1. Solid lines in FIG. 5 illustrate estimated values corresponding to the first AoAs. Circles in FIG. 5 indicate main-lobe angles provided that the first AoAs are respectively adopted as side-lobe angles. As indicated by the solid lines in FIG. 5, the estimated values of the first AoAs mainly transition in a range from 0 to 100 degrees. Consequently, it can be understood that the wireless tag is present in the direction substantially ranging from 0 to 100 degrees viewed from the electronic device 1. Meanwhile, in FIG. 5, some estimated values indicate values ranging from 150 to 300 degrees. These estimated values can be regarded as outliers. Here, in FIG. 5, at timing when the outlier is output, the circle indicating the main-lobe angle sometimes appears to be an angle close to the direction where the wireless tag is likely to be exist. Specifically, at sample numbers 50 to 120 and sample numbers 200 to 260 encircled by broken lines in FIG. 5, the main-lobe angles indicate the likely direction of the wireless tag at timing of outliers. In this case, by replacing the outlier with the main-lobe angle, the AoA indicates an angle close to the correct value.

Figure 6A:
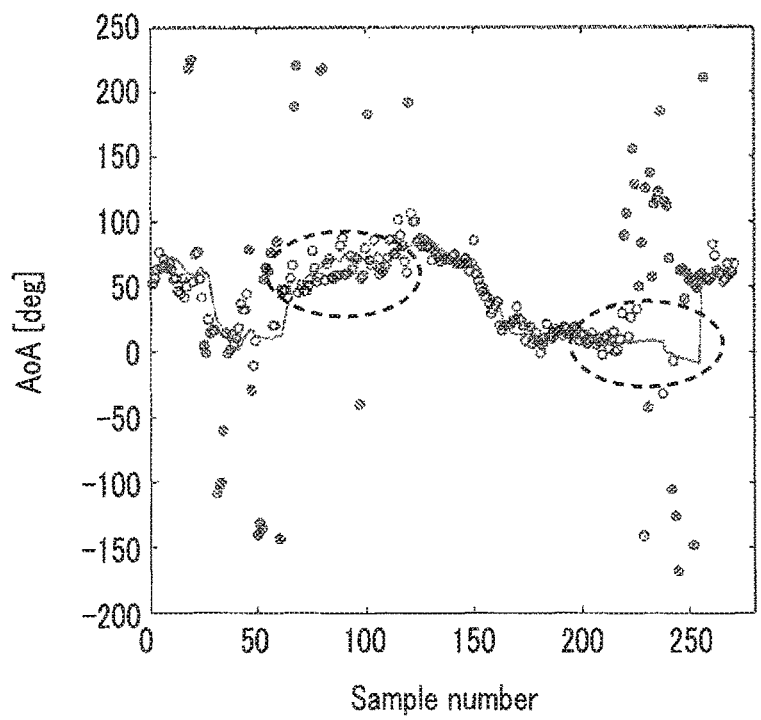
FIG. 6A explains an advantageous effect of the angle estimation system of the embodiment.
Figure 6B:
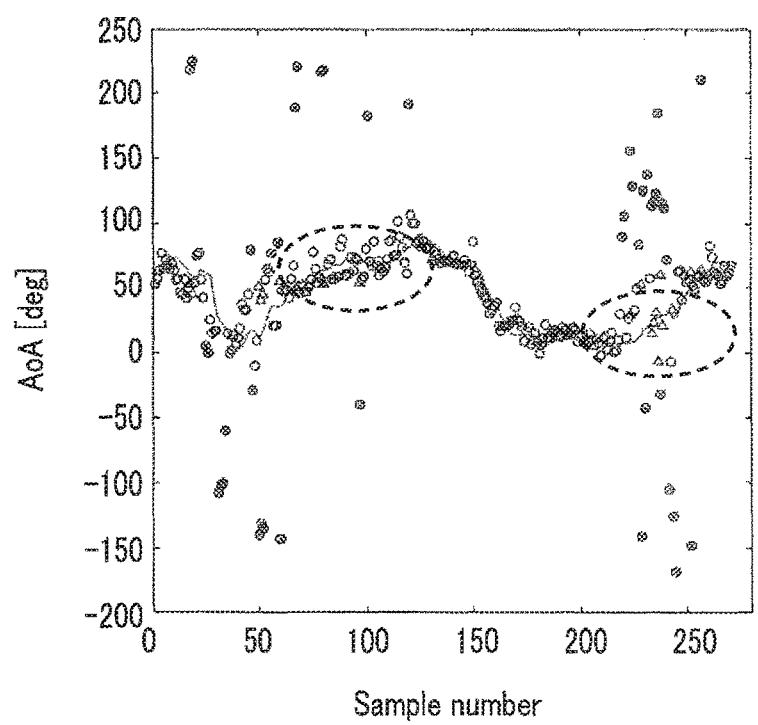
FIG. 6B explains the advantageous effect of the angle estimation system of the embodiment.

FIGS. 6A and 6B explain the advantageous effect of the AoA estimation system of the embodiment. Here, FIGS. 6A and 6B indicate results acquired by assuming that both the first criterion and the second criterion are set for the absolute values of differences from the predicted values with respect to data in FIG. 5 and by performing outlier determination and replacement determination and by then performing tracking with Kalman filter.

FIG. 6A illustrates the tracking result in a case where the points determined as outliers by applying outlier determination to the first AoAs are simply excluded. On the other hand, FIG. 6B illustrates the tracking result in a case where if the main-lobe angle with assumption that the first AoA is regarded as the side-lobe angle is not an outlier, the first AoA is replaced with the main-lobe angle. The circular marks in FIGS. 6A and 6B indicate the first AoAs. Generally, the azimuth is defined on a circle and 0 and 360 degrees are connected to each other. Accordingly, in FIGS. 6A and 6B, 360 degrees are added to or subtracted from each of the estimated first AoA so as to minimize the absolute value of the difference from the predicted value. In FIGS. 6A and 6B, cross marks plotted to be overlaid on the circular marks indicate that the corresponding first AoAs are determined as outliers. Accordingly, in FIG. 6A, the tracking is performed so as to skip cross marks. On the other hand, triangles in FIG. 6B are main-lobe angles corresponding to the first AoAs having been determined not to be outliers based on the second criterion and have been provided for replacement. In FIG. 6B, when a plurality of main-lobe angles are acquired, the main-lobe angle having the minimum absolute value of the difference from the predicted value is selected from among the main-lobe angles. Solid lines in FIGS. 6A and 6B indicate predicted values acquired by tracking. Estimated values by the Kalman filter are obtained by bringing back the time of the predicted value using the inverse matrix of a state transition matrix. The estimated values form a line substantially identical to that of the predicted values. Accordingly, the estimated values are omitted in FIGS. 6A and 6B.

In FIGS. 6A and 6B, the sample numbers 50 to 120 and the sample numbers 200 to 260, which are encircled by the broken lines in FIG. 5, are also encircled by broken lines. For the sample numbers 50 to 120, the predicted values in FIG. 6B are more closely along the first AoA values than the predicted values in FIG. 6A are. For the sample numbers 200 to 260, the predicted values in FIG. 6A largely deviate from the likely values owing to continuation of outliers. The sample numbers 200 to 260 in FIG. 6A are in an untracked state. On the other hand, the predicted values in FIG. 6B are connected to the sample number 261 with a natural curve.

FIG. 7 illustrates the configuration of a third example of an angle estimation system according to an embodiment. In a case where the electronic device 1 is a low-cost product, such as a Bluetooth device, there is a possibility that the electronic device 1 cannot perform too advanced processes. In this case, tracking may be performed by a processing device that resides at a place other than that of the electronic device 1 or is another device, for example, a server for the processes. In this case, as illustrated in FIG. 7, the electronic device 1 may have a configuration that only outputs the first AoA and the main-lobe angle corresponding thereto. The electronic device 1 in FIG. 7 comprises a candidate acquisition unit 11. The candidate acquisition unit 11 extracts main-lobe angles corresponding to all the first AoAs estimated by the AoA estimator 6, with reference to the side-lobe/main-lobe correspondence table. The candidate acquisition unit 11 makes sets of the extracted main-lobe angles and the first AoAs, and outputs the sets to the processing device, such as a server.

According to a modification example of the third example, an electronic device 1 does not necessarily comprise the candidate acquisition unit 11 and the correspondence table memory 9. In this case, the processing device, which is other than the electronic device 1, comprises the candidate acquisition unit 11 and the correspondence table memory 9. The processing device performs processes from the outlier determination to tracking. The signal receiver 2 and the processing circuitry 5 of the electronic device 1 may reside at places away from each other, or be provided in machines different from each other.

FIG. 8 is a flowchart illustrating an algorithm of a signal processing method according to an embodiment. The processes in FIG. 8 are performed by the processing circuitry 5. The processes by the processing circuitry 5 described below are not necessarily limited to those to be executed according to a program stored in a memory. The processes by the processing circuitry 5 may be executed according to an algorithm embedded in hardware, such as an ASIC and an FPGA.

The processing circuitry 5 estimates the first AoA by AoA estimation based on information from the respective antenna elements of the antenna array 3 (S200).

Next, the processing circuitry 5 determines whether the first AoA is an outlier or not based on the first criterion (S201). If the first AoA is not an outlier in step S201, the processing transitions to S206. At this time, the processing circuitry 5 outputs the first AoA as the second AoA (S206).

If the first AoA is an outlier in step S201, the processing transitions to S202. At this time, the processing circuitry 5 refers to the side-lobe/main-lobe correspondence table to acquire the main-lobe angle with the first AoA being adopted as the side-lobe angle (S202).

Next, the processing circuitry 5 determines whether the main-lobe angle is an outlier or not based on the second criterion (S203). If the main-lobe angle is not an outlier in step S203, the processing transitions to S205. At this time, the processing circuitry 5 adopts the main-lobe angle as the second AoA (S205). Subsequently, the processing circuitry 5 outputs the main-lobe angle as the second AoA (S206).

If the main-lobe angle is an outlier in step S203, the processing transitions to S204. At this time, the processing circuitry 5 does not output the second AoA (S204).

The processes as illustrated in FIG. 8 can reduce the frequency of discontinuity of output for a long period due to continuation of outliers. As illustrated in FIG. 7, the processes illustrated in FIG. 8 are not necessarily performed by the same processing circuitry 5. The processes illustrated in FIG. 8 may be performed by a plurality of distributed devices.

FIG. 9 illustrates the configuration of a fourth example of an angle estimation system according to an embodiment. In the fourth example, the antenna array is provided not on the reception side but on the transmission side. However, angle estimation is performed on the reception side. Such angle estimation method is referred to as AoD (Angle-of-Departure) estimation.

In FIG. 9, a transmitter 20 comprises an antenna array 21*a*. Transmission circuitry 22 of the transmitter 20 causes each antenna element of the antenna array 21*a* to output signals that are orthogonal to each other. The transmission circuitry 22 transmits, for example, known signals, such as continuous waves (CW) or a pilot while switching the antenna elements at every constant time period, modulated signals with symbols orthogonal with respect to the antenna elements, or different frequency signals with respect to the individual antenna elements.

Meanwhile, the electronic device 1 on the reception side preliminarily knows the type of the signals scheduled to arrive and the antenna element from which the signals scheduled to arrive, through notification or the like issued by the transmitter 20. The electronic device 1 then separates the complex signals of the antenna elements from the received signals. To allow the AoD estimator 6*a* to estimate the AoD, the arrangement of the antenna array 21*a* or antenna characteristics information are required. To allow a position estimator, not illustrated, to estimate the position of a device comprising an antenna 3*a* with reference to the transmitter 20, the position of the transmitter 20 is required. The arrangement of the antenna elements or the antenna characteristics information, and the position of the transmitter 20 have already been known, through preliminary notification to the electronic device 1, or being held in a memory.

As described above, the side-lobe/main-lobe correspondence table can be created from information on the arrangement of the antenna elements and the characteristics information on the antenna elements. Accordingly, in a case where the processing capability on the reception side is high, the side-lobe/main-lobe correspondence table may be extemporarily created by a method similar to the table creation method described above. In a case where the side-lobe/main-lobe correspondence table is acquired through communication from another party and where the side-lobe/main-lobe correspondence table is created only from the information on the arrangement of the antenna elements based on an assumption that the antenna characteristics are ideal, the amount of notification of the table can be reduced.

For example, in a case of an equal interval circular array, the arrangement of the antenna elements is rotationally symmetric with respect to the center of a circle. Accordingly, a table for all the angles can be created only with information on half an angle between the direction of an antenna element from the center of the circle and the direction of an adjacent antenna element. For example, in FIG. 2B, the antenna array is a four-element circular array. At this time, the angle between antenna elements is 90 degrees. Accordingly, only with information from 0 to 45 degrees, the table for all the angles of the antenna array can be created. Specifically, 90 degrees are added to the side-lobe angle corresponding to the main-lobe angle ranging from 0 to 90 degrees on the ordinate axis, thereby acquiring the side-lobe angle corresponding to the main-lobe angle ranging from 90 to 180 degrees. As described above, in the case of the four-element circular array, it is understood that 90 degrees are to be sequentially added to the main-lobe angle and the side-lobe angle. Furthermore, in the case of the four-element circular array, a main lobe having a main-lobe angle ranging from 0 to 45 degrees and a main lobe having a main-lobe angle ranging from 90 to 45 degrees are linearly symmetrical with each other. Consequently, for example, the side lobe appearing at 122 degrees when the main-lobe angle is 30 degrees, appears at 60−(122−30)=−32 degrees, i.e., 328 degrees, when the main-lobe angle is 60 degrees.

Thus, the pairs of the main-lobe angles and the side-lobe angles over all the angles of the antenna array can be generated, using the symmetric property of the antenna elements, based on the pairs of the main-lobe angle and the side-lobe angle at half an angle between antenna elements. The side-lobe/main-lobe correspondence table may be generated by sorting the pairs of all the angles. The symmetric property of the main-lobe angle and the side-lobe angle due to the symmetric property of the antenna elements can be held even when the ordinate axis and the abscissa axis are replaced with each other. Consequently, data on half an angle between the antenna elements in the side-lobe/main-lobe correspondence table may be acquired through communication or the like, and the table over all the angles may be generated based on the acquired data on half an angle between the antenna elements.

Unlike the circular array, in a case of an equal interval linear array, such a symmetric property is only a linear symmetric property with respect to a direction perpendicular to the array line. In this case, remaining data may be generated based on data on the front (0 degree) to a side 90 degrees in the side-lobe/main-lobe correspondence table.

In FIG. 9, the device on the reception side comprises an electronic device 30 and a processing device 40. The electronic device 30 comprises an antenna 3*a*, a receiver 4, and an AoD estimator 6*a*. The processing device 40 comprises an outlier determinator 7, a replace unit 8, and a correspondence table memory 9. The processing device 40 may comprise a tracking filter 10.

Unlike FIG. 1, the antenna 3*a* is a single antenna element, and receives signals transmitted from the transmitter 20.

The receiver 4 in the example in FIG. 9 performs various receiving processes on a physical layer and processes on a protocol layer, and converts received signals to be used for AoD estimation into complex signals. During this conversion, the receiver 4 in the example in FIG. 9 separates the received signals into signals for the respective antenna elements of the antenna array 21*a*. For example, in a case where the signals are transmitted in a time division manner, with the antenna elements being switched, the receiver 4 separates the received signals in units of time. If the received signals are orthogonal-code-modulated, the receiver 4 despreads the received signals with respect to each antenna element with a predefined code.

The AoD estimator 6*a* estimates the first AoD. The AoD estimation method in the AoD estimator 6*a* may be basically similar to that in a case where the antenna arrays described above are provided in the electronic device. However, for AoD estimation, the information on the arrangement of the antenna elements of the antenna array 21*a* or the antenna characteristics information on the transmission side is used.

The first AoD estimated in FIG. 9 is an angle indicating the direction of the electronic device 1 viewed from the transmitter 20. Typically, information on the phase difference and amplitude difference between the antenna elements is used for AoD estimation using an antenna array. Even if transmission and reception are replaced with each other, the phase difference and the amplitude difference have substantially identical values. Accordingly, even with the configuration as in FIG. 9, the AoD estimation can be performed. The AoD estimated when signals transmitted from the antenna array 21*a* included in the transmitter 20 are received by the antenna 3*a* included in the electronic device 1, and the AoA estimated when signals transmitted from the antenna 3*a* included in the electronic device 1 are received by the antenna array 21*a* included in the transmitter 20 are substantially equivalent to each other. Consequently, the ways where AoAs or AoDs become outliers owing to multipath are equivalent between the case in FIG. 1 and the case in FIG. 9.

Here, in FIG. 9, the processing device 40 may be integrated with the electronic device 30 as with FIG. 1, or be separated from the electronic device 30 and be connected to the electronic device 30 via communication. The processing device 40 may be integrated with the transmitter 20.

In a case where the electronic device 30 is a device, such as a wireless tag, having low cost and low energy consumption, the electronic device 30 cannot have too many functions. The electronic device 30 provides the AoD estimation result for the processing device 40 having high processing capability, for the sake of delegation. Communication between the electronic device 30 and the processing device 40 in this case may be wired or wireless. The communication may be performed through a scheme that both the electronic device 30 and the processing device 40 support.

Even in a case where the electronic device 30 is a device, such as a smart phone, having a somewhat high processing capability, the communication rate during acquisition of the side-lobe/main-lobe correspondence table from the transmitter 20 is not low if such type of a device passes by the transmitter 20 for only a moment. The side-lobe/main-lobe correspondence table may be exchanged. It is, however, desirable that the transmitter 20 itself, another processing device residing semi-fixedly around the transmitter 20, or another processing device connected via another node residing near to the transmitter 20 preliminarily store the side-lobe/main-lobe correspondence table.

The size of the device comprising the antenna array tends to be larger than that of the device comprising no antenna array. The price of the device comprising the antenna array tends to be higher than that of the device comprising no antenna array. The angle estimation system in the fifth example illustrated in FIG. 10 may be adopted as an example of application to a wireless tag.

Figure 10:
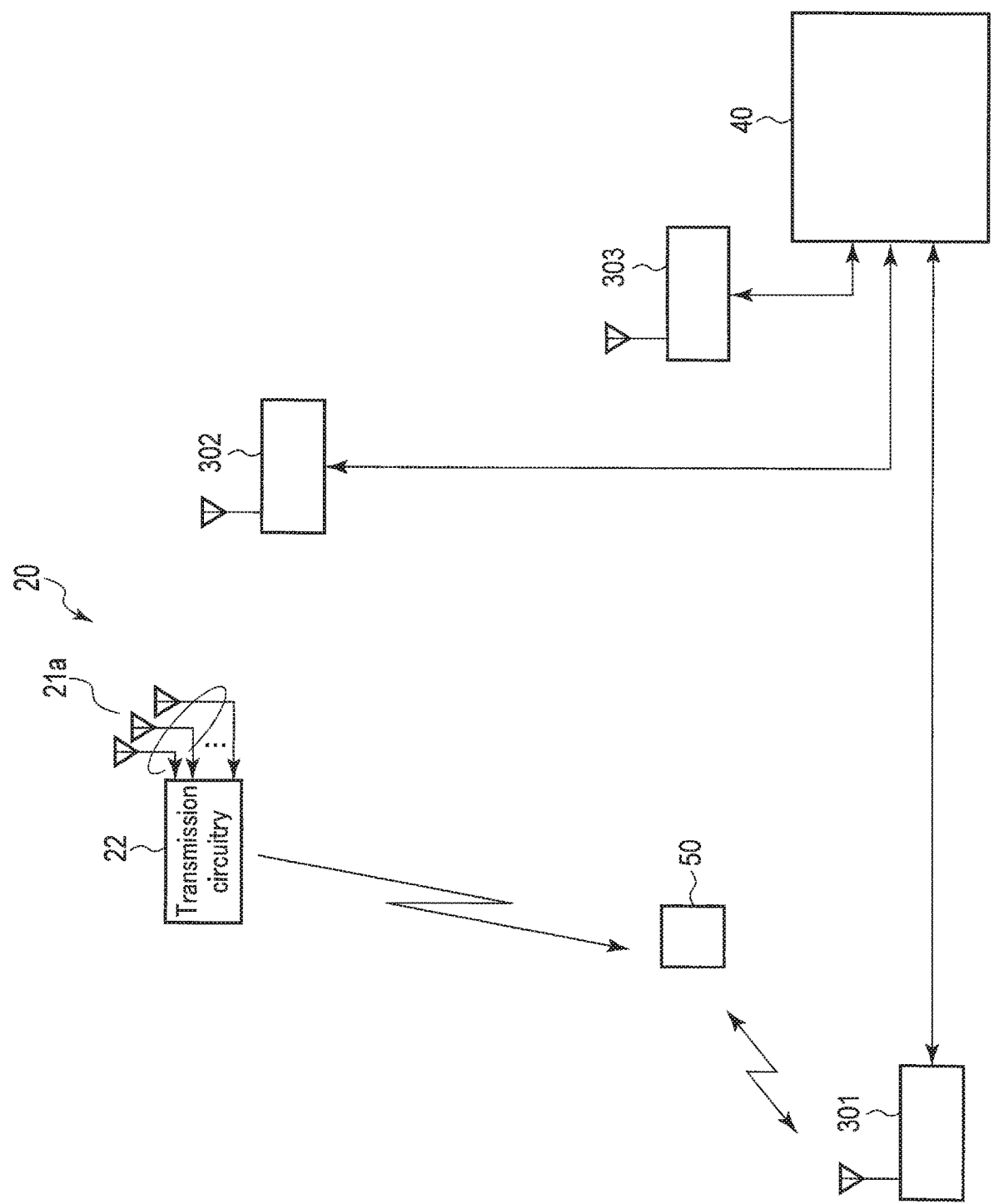
FIG. 10 illustrates the configuration of a fifth example of an angle estimation system according to an embodiment.

In FIG. 10, the transmitter 20 comprising the antenna array 21*a* continuously transmits signals for AoD estimation with relatively high power. If the power is high, the signals reach a relatively wide range. Meanwhile, a wireless tag 50 serving as an angle detection target receives signals from the transmitter 20, and estimates the first AoD. The wireless tag 50 then transmits the first AoD to at least any one of nodes 301, 302 and 303. The wireless tag 50 does not necessarily estimate the first AoD. In this case, the wireless tag 50 transmits the complex signals through the respective antenna elements, as they are, to another device comprising an AoD estimator.

The nodes 301, 302 and 303 are arranged more highly densely than the transmitter 20, and are configured to perform low-power communication. The processing device 40 and the nodes 301, 302 and 303 are, for example, wiredly connected to each other. The processing device 40 and the nodes 301, 302 and 303 may form, for example, a mesh type communication network. FIG. 10 illustrates the three nodes. However, the number of nodes is not limited to three.

The nodes 301, 302 and 303 receive the first AoD from the wireless tag 50, and transmit the received first AoD to the processing device 40. The processing device 40 performs a process, such as the outlier determination described above, and replaces the first AoD with the main-lobe angle, if necessary. Information on a second AoD acquired by the processing device 40 is notified by the processing device 40 to another device that uses information on the angle of the wireless tag 50. The processing device 40 may have a single unit configuration, be integrated with any of the nodes 301, 302 and 303, or be integrated with the transmitter 20.

In such a fifth example, the number of devices that comprise an antenna array can be reduced. This reduction can prevent the power consumption of the wireless tag and the size of the device from increasing, and detect the angle with a small adverse effect of outliers.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus, comprising:
   a receiving element array configured to receive a signal radiated from a transmitter; and
   processing circuitry configured to:
   estimate a first angle of arrival (AoA) of an arrival wave corresponding to a received signal from the receiving element array, based on the received signal;
   determine whether the estimated first AoA is an outlier or not, based on a first criterion;
   output the first AoA as a second AoA, when the first AoA is not to be an outlier;
   acquire one or more main-lobe angles assuming that the first AoA is a side-lobe angle of the receiving element array, when the first AoA is to be an outlier;
   determine whether at least one of the main-lobe angles is an outlier or not, based on a second criterion; and
   output a main-lobe angle that is determined not to be an outlier as the second AoA.

2. The electronic apparatus according to claim 1, wherein the receiving element array is an antenna array.

3. The electronic apparatus according to claim 1, wherein the processing circuitry comprises a memory configured to store a side-lobe/main-lobe correspondence table that is a table indicating correspondence between the side-lobe angles and the main-lobe angles.

4. The electronic apparatus according to claim 1, wherein when a plurality of the main-lobe angles corresponding to the first AoA are present, the processing circuitry determines whether at least one of the plurality of main-lobe angles is an outlier or not, based on the second criterion, and selects one of the plurality of main-lobe angles having a minimum probability of being an outlier as the second AoA.

5. The electronic apparatus according to claim 1, wherein the processing circuitry outputs the second AoA to a filter.

6. The electronic apparatus according to claim 5, wherein:
the filter outputs a predicted value of an AoA of the arrival wave, based on the input second AoA, and
the second criterion is set to an absolute value of a difference between the at least one of the main-lobe angles and the predicted value, the predicted value being acquired by predicting the AoA at a time when the received signal is received.

7. The electronic apparatus according to claim 5, wherein the filter is an adaptive tracking filter.

8. An AoA estimation system, comprising:
a transmitter configured to radiate a signal;
a receiving element array configured to receive the signal radiated from the transmitter; and
a processor configured to:
estimate a first AoA of arrival wave corresponding to a received signal from the receiving element array, based on the received signal;
determine whether the estimated first AoA is an outlier or not, based on a first criterion;
output the first AoA as a second AoA, when the first AoA is not to be an outlier;
acquire one or more main-lobe angles assuming that the first AoA is a side-lobe angle of the receiving element array, when the first AoA is to be an outlier;
determine whether at least one of the main-lobe angles is an outlier or not, based on a second criterion; and
output a main-lobe angle determined not to be an outlier as the second AoA.

9. The electronic apparatus according to claim 1, wherein the processing circuitry is further configured to output a predicted value of an AoA of the arrival wave, based on the second AoA.

10. The AoA estimation system according to claim 8, further comprising a tracking filter configured to output a predicted value of an AoA of the transmitter arrival wave, based on the second AoA.

* * * * *